United States Patent [19]

Iida et al.

[11] Patent Number: 4,961,462

[45] Date of Patent: Oct. 9, 1990

[54] CONTROL APPARATUS FOR AUTOMOBILE AIR-CONDITIONERS

[75] Inventors: Katsumi Iida; Akihiko Takano, both of Konan, Japan

[73] Assignee: Diesel Kiki Co., Ltd., Tokyo, Japan

[21] Appl. No.: 436,792

[22] Filed: Nov. 15, 1989

[51] Int. Cl.$^5$ .......................... B60H 1/00; B60H 3/00; F24F 11/02; F24F 13/10

[52] U.S. Cl. ......................... 165/12; 165/42; 165/43; 236/91 C; 98/2.01

[58] Field of Search ....................... 165/12, 28, 42, 43; 236/91 C; 98/2.01, 2.11

[56] References Cited

U.S. PATENT DOCUMENTS 4,760,772  8/1988  Horiguchi et al. ................... 98/2.01

FOREIGN PATENT DOCUMENTS

| | | | |
|---|---|---|---|
| 0133914 | 8/1983 | Japan | 236/91 C |
| 0034913 | 2/1984 | Japan | 236/91 C |
| 0034915 | 2/1984 | Japan | 236/91 C |
| 0139507 | 6/1986 | Japan | 236/91 C |
| 0074710 | 4/1988 | Japan | 98/2.01 |

*Primary Examiner*—John Ford
*Attorney, Agent, or Firm*—Wenderoth, Lind & Ponack

[57] ABSTRACT

An apparatus for controlling an automobile air-conditioner wherein the direction of solar radiation is determined based on a signal which is obtained by retarding the leading edge of a solar radiation signal and the position of an air-distributing door is controlled according to the thus obtained signal. A signal whose leading and trailing edges are progressively increasing and decreasing, respectively, is used for the calculation of a signal corresponding to the thermal load in the vehicle passenger compartment. The operation of various components of the air-conditioner including a blower is controlled by the result of calculation of the thermal load signal.

3 Claims, 11 Drawing Sheets

CONTROL APPARATUS FOR AUTOMOBILE AIR-CONDITIONERS

BACKGROUND OF THE INVENTION

1. Field of the Invention

The present invention relates generally to apparatus for controlling automobile air-conditioners, and more particularly to an apparatus for controlling the operation of an automobile air-conditioner so as to condition air in the vehicle passenger compartment with adequate consideration for the influence of solar radiation.

2. Description of the Prior Art

Typical examples of such automobile air-conditioner controlling apparatus are disclosed in Japanese Utility Model Laid-open Publication No. 59-80109 and Japanese Patent Publication No. 62-5085. The disclosed control apparatus includes four solar radiation sensors disposed adjacent to four corners in a vehicle passenger compartment for detecting the direction and quantity of solar radiation which are in turn used to control the position of an air-distributing door for canceling out the influence of solar radiation, thereby eliminating uneven temperature distribution in the vehicle passenger compartment.

As shown in Japanese Patent Laid-open Publication No. 59-34915, a control signal which is used for controlling the temperature of the vehicle passenger compartment is obtained by modifying the waveform of a solar radiation quantity detection pulse signal in such a manner that leading and trailing edge portions of the pulse signal progressively rises and lowers, respectively. With this waveform modification, the vehicle compartment temperature varies gently and smoothly and hence the occupant feels a sense of natural air-conditioning.

However, when such waveform-modified solar radiation quantity detection signal is used to calculate the direction of solar radiation for controlling the position of the air-distributing door, the resulting air-distribution control is incapable of follow up changes in the solar radiating direction. This is because the direction of solar radiation changes frequently depending on a traveling environment of the automobile. In this instance, if the solar radiation quantity detection signal changes progressively in the process of calculation of the solar radiating direction, the presence and absence of the solar radiation cannot be followed by the actual air-conditioning with the result that a great temperature difference is produced in the vehicle passenger compartment.

SUMMARY OF THE INVENTION

With the foregoing difficulties in view, it is an object of the present invention to provide a control apparatus for an automobile air-conditioner, which is capable of controlling the distribution of conditioned air in the vehicle passenger compartment in immediate response to a change of the direction of solar radiation even when the solar radiating direction changes frequently during the travel of an automobile.

Another object of the present invention is to provide a control apparatus for an automobile air-conditioner, which is capable of conditioning the vehicle passenger compartment with an adequate consideration for the quantity and direction of solar radiation without causing an unpleasant drastic change of air-conditioning feeling.

According to the present invention, there is provided an apparatus for controlling an automobile air-conditioner, comprising: at least one transverse direction solar radiation quantity detection means having two light receiving surfaces inclined at an angle and facing transversely of the direction of movement of an automobile; primary filter calculation means for smoothening rapid fluctuations of a solar radiation signal detected by the transverse direction solar radiation quantity detection means; solar radiating direction calculation means for calculating the direction of solar radiation by using the result of calculation by the primary filter calculation means; solar radiation quantity calculation means for calculating the quantity of solar radiation received in a vehicle passenger compartment by using the result of calculation by the primary filter calculation means; secondary filter calculation means for changing an output signal from the solar radiation quantity calculation means in such a manner that the output signal increases progressively at a first predetermined gradient from the leading edge of the detection of solar radiation and also decreases progressively at a second predetermined gradient from the time near the trailing edge of the detection of solar radiation; total signal calculation means for calculating a total signal corresponding to a thermal load in the vehicle passenger compartment based on at least a vehicle passenger compartment temperature, a setting temperature and the result of calculation by the secondary filter calculation means; air-distributing door drive means for actuating an air-distributing door based on the result of calculation by the solar radiating direction calculation means; thermal load adjustment means for adjusting the thermal load on the automobile air-conditioner, the adjustment means including at least an air-flow duct opening to the vehicle passenger compartment, a blower disposed in the duct for forcing air downstream through the duct to the vehicle passenger compartment, a heat exchanger disposed in the duct for subjecting air to heat-exchanging process as the air is forced to passes around the heat exchanger; and thermal load drive means for driving the thermal load adjustment means based on the result of calculation by the total signal calculation means.

With this construction, a signal indicative of solar radiating quantity detected by the transverse direction solar radiation quantity detection means is smoothened by the first filter calculation means to obtain a signal whose trailing edge is delayed by a predetermined period of time for removing rapid fluctuations of the input signal. The thus obtained signal is used for the calculation of the direction of solar radiating carried out by the solar radiating direction calculation means. Then, the result of this calculation is used for controlling the air-distributing door. On the other hand, the result of calculation by the primary filter calculation means and the result of calculation by the solar radiating direction calculation means are used for the calculation of the quantity of solar radiation which is achieved by the solar radiation quantity calculation means. The leading and trailing edges of the result of this calculation are processed by the secondary filter calculation means to progressively increase and decrease respectively. The thus processed calculation result is used for the calculation of the total signal.

The above and other objects, features and advantages of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

The present invention will be described hereinbelow in greater detail with reference to a preferred embodiment shown in the accompanying drawings.

Figure 1:
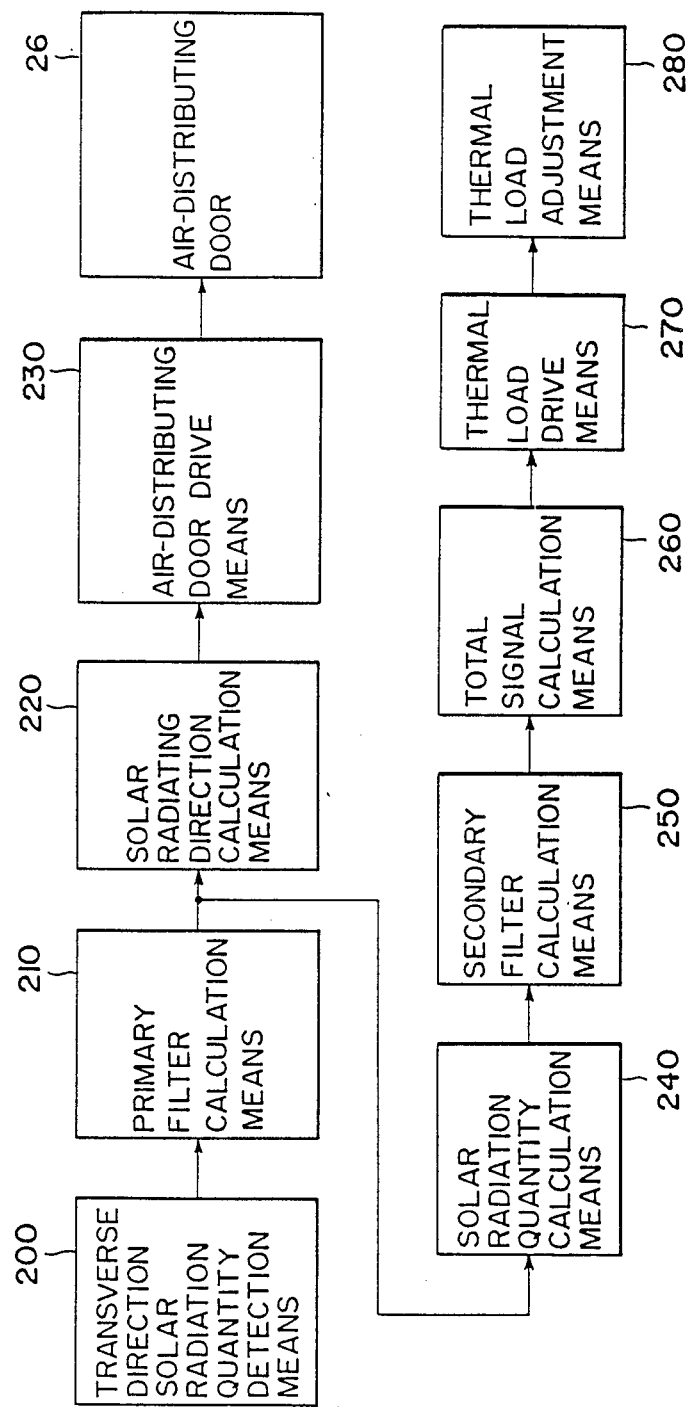
FIG. 1 is a block diagram of an apparatus for controlling an automobile air-conditioner according to the present invention.

As shown in FIG. 1, a control apparatus for an automobile air-conditioner according to the present invention generally includes at least one transverse direction solar radiation quantity detection means 200 having two light receiving surfaces inclined at an angle and facing transversely of the direction of movement of an automobile; primary filter calculation means 210 for smoothening rapid fluctuations of a solar radiation signal detected by the transverse direction solar radiation quantity detection means 200; solar radiating direction calculation means 220 for calculating the direction of solar radiation by using the result of calculation by the primary filter calculation means 210; solar radiation quantity calculation means 240 for calculating the quantity of solar radiation received in a vehicle passenger compartment by using the result of calculation by the primary filter calculation means 210; secondary filter calculation means 250 for changing an output signal from the solar radiation quantity calculation means 240 in such a manner that the output signal increases progressively at a first predetermined gradient from the leading edge of the detection of solar radiation and also decreases progressively at a second predetermined gradient from the time near the trailing edge of the detection of solar radiation; total signal calculation means 260 for calculating a total signal corresponding to a thermal load in the vehicle passenger compartment based on at least a vehicle passenger compartment temperature, a setting temperature and the result of calculation by the secondary filter calculation means 250; air-distributing door drive means 230 for actuating an air-distributing door 26 based on the result of calculation by the solar radiating direction calculation means 220; thermal load adjustment means 280 for adjusting the thermal load on the automobile air-conditioner, the adjustment means including at least an air-flow duct opening to the vehicle passenger compartment, a blower disposed in the duct for forcing air downstream through the duct to the vehicle passenger compartment, a heat exchanger disposed in the duct for subjecting air to heat-exchanging process as the air is forced to passes around the heat exchanger; and thermal load drive means 270 for driving the thermal load adjustment means 280 based on the result of calculation by the total signal calculation means 260.

Figure 2:
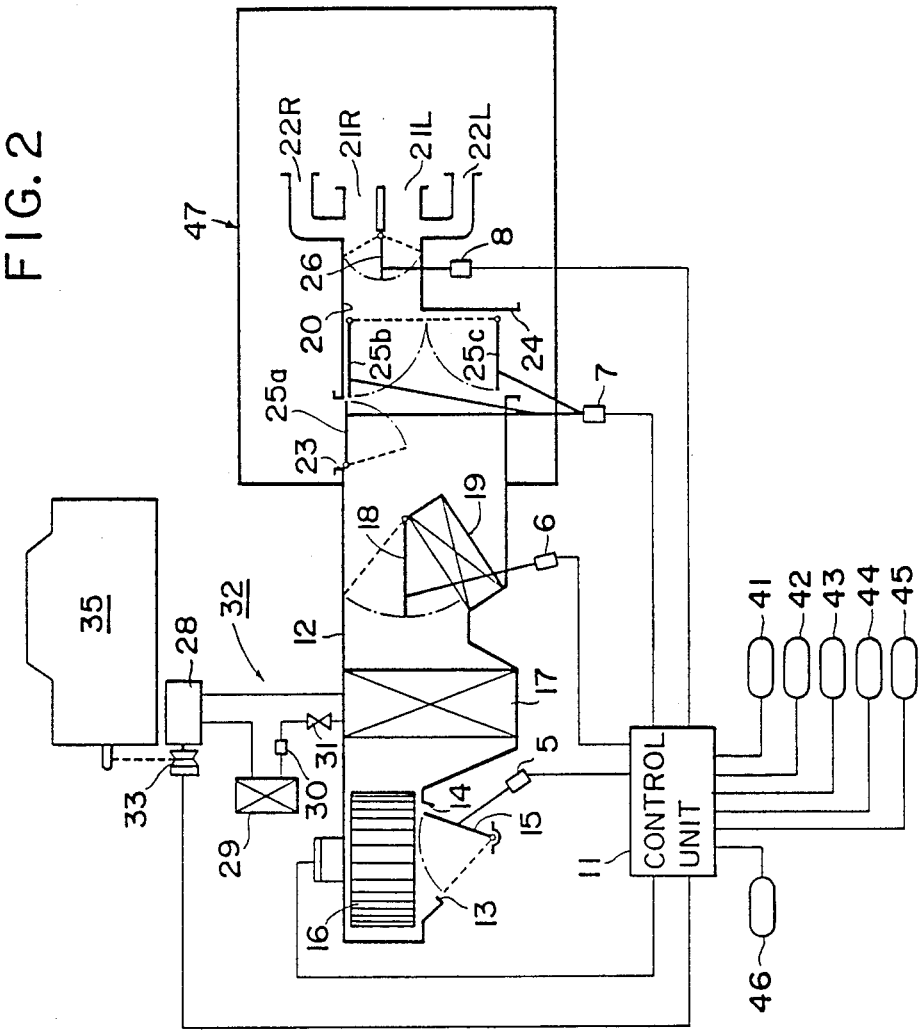
FIG. 2 is a diagrammatical view illustrative of the structural details of an automobile air-conditioner incorporating a control apparatus according to the present invention.

As shown in FIG. 2, an automobile air-conditioner in which a control apparatus according to the present invention is incorporated includes a main air-flow duct 12 having at its upstream end an outside air inlet 13 and a recirculated air inlet 14 that are provided in bifurcated fashion, and a selecting door 15 disposed at the junction between the air inlets 13, 14. The selecting door 15 is actuated to continuously change its opening to adjust the ratio of the outside air to the recirculated air to be introduced into the airflow duct 12.

A blower 16 is disposed in the duct 12 adjacent to the air inlets 13, 14 for forcing the air to flow downstream through the duct 12. The duct 12 also includes an evaporator 17 disposed downstream of the blower 16.

The evaporator 17 is connected in fluid circuit with a compressor 28, a condenser 29, a reservoir tank 30 and an expansion valve 31 to jointly constitute a refrigeration cycle or system 32 for cooling air passing around the evaporator 17. The compressor 28 is operatively connected with an engine 35 via an electromagnetic clutch 33 which selectively transmits a driving power from the engine 35 to the compressor 28.

An air-mix door 18 and a heater core 19 are disposed in juxtaposition downstream of the evaporator 17 so that the ratio of the amount of air flowing directly through the heater core 19 to the amount of air bypassing the heater core 19 is adjusted depending on the opening of the air-mix door 18. The air passed through the heater core 19 and the air bypassed the heater core 19 are mixed up into temperature-conditioned air of a desired temperature.

The duct 12 has at its downstream end a defroster outlet 23, a vent outlet 20 and a heat outlet 24 that are provided in branched fashion and all open to a vehicle compartment 47. Three mode doors 25a, 25b, 25c are disposed at the respective outlets 23, 20, 24 and adapted to be selectively opened and closed to change the discharge mode of the air-conditioner. The vent outlet 20 is further branched into four vent openings, namely two juxtaposed right vent openings 21R, 22R and two juxtaposed left vent openings 21L, 22R. The respective vent openings 21R, 22R, 21L, 22L are selectively opened and closed by an air-distributing door 26 disposed at the junction between the branched vent openings 21R, 22R, 21L, 22L.

Figure 8A:
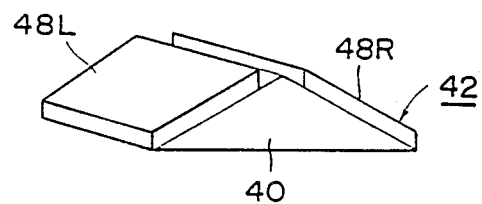
FIGS. 8a and b are a perspective view of a solar radiation sensor alone and within the automobile respectively.

The selecting door 15, air-mix door 18, mode doors 25a–25c and air-distributing door 26 are driven respectively by actuators 5, 6, 7 and 8 that are controlled by a control unit 11. The control unit 11 includes driver circuits (not shown) for driving the respective actuators 5–8, a microcomputer (not shown) for controlling the driver circuits, an A/D converter (not shown) connected with the microcomputer, etc. The A/D converter is connected with an opening sensor comprised of a potentiometer 41 for detecting the opening of the air-mix door 18, a solar radiating condition sensor 42 for detecting the quantity of solar radiation which is incident to a vehicle passenger compartment 47, an outside air temperature sensor 43 for detecting the temperature of outside air, a vehicle compartment temperature sensor 44 for detecting a representative temperature in the vehicle passenger compartment 47, a temperature setter 45 for setting a desired temperature for the vehicle passenger compartment 47. The microcomputer is connected with an auto switch 46 which is actuated to instruct whether the control of air to be drawn into the air-flow duct 12 is achieved automatically or manually. The solar radiating condition sensor 42 generally comprises, as shown in FIG. 8(a), a right side light receiving element 48R and a left side light receiving element 48L fixed respectively to two sloping surfaces of a roof-like sensor base 40.

Figure 8B:
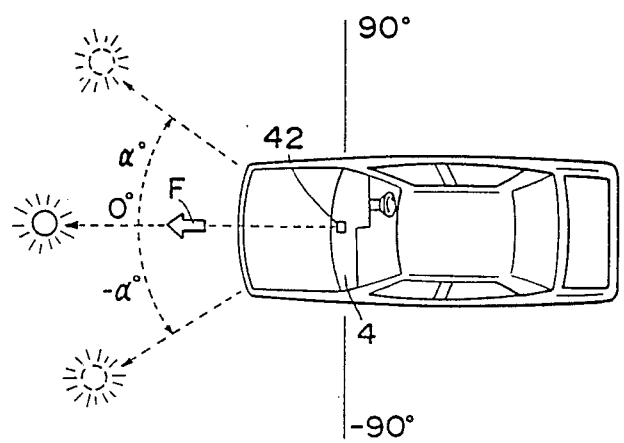

The solar radiating condition sensor 42 is disposed on an upper surface 4 of the instrument panel of an automobile in such a manner that the ridge of the roof-like sensor base 40 extends parallel to the direction of movement of the automobile indicated by the arrow F in FIG. 8(b). With this arrangement, the solar radiating condition sensor 42 is sensible to solar radiation which is incident upon the sensor 42 at an angle $-\alpha°$, $\alpha°$ (max. $-90°$ and $+90°$) with respect to a central reference line which is aligned with the ridge of the roof-like sensor base 40 and has an angle 0°.

Figure 3:
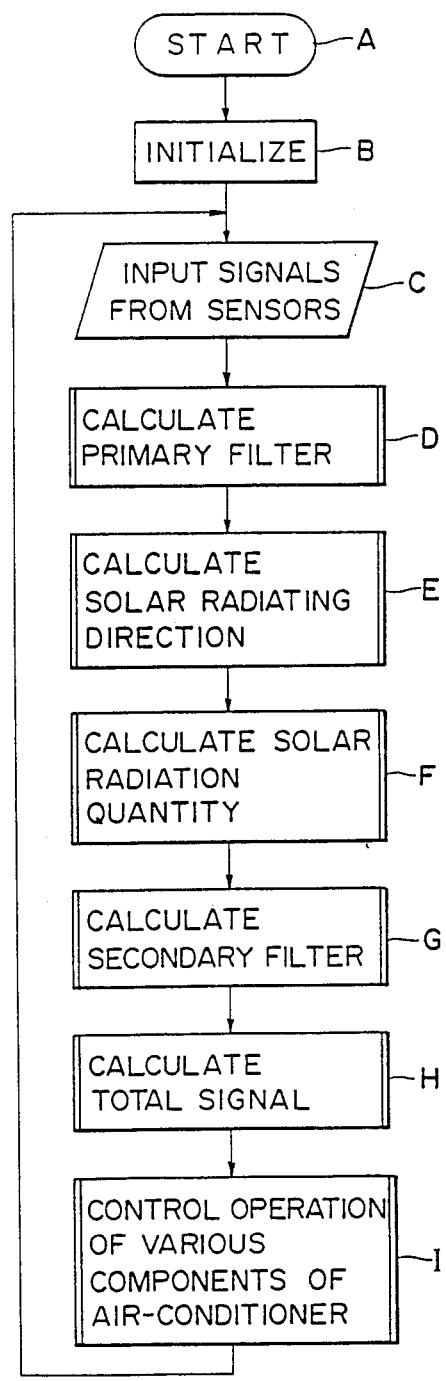
FIG. 3 is a flowchart showing a main control routine achieved by a microcomputer in a control unit incorporated in the control apparatus for controlling various components of the air-conditioner including an air-distributing door.

The operation of the microcomputer incorporated in the control unit 11 will be described below with reference to a flowchart shown in FIG. 3 in which a main control routine achieved for controlling various components of the automobile air-conditioner including the air-distributing door 26 is illustrated.

The main control routine of the microcomputer starts in a step A in accordance with a program stored in the microcomputer. In the next step B, various variables and flags are initialized.

In a next following step C, various signals detected by the sensors including the opening sensor 41 are inputted. Then, the control proceeds to a step D.

In the step D, a primary filter calculation is achieved for calculating delayed solar radiation input values $S_{R1}$, $S_{L1}$ which are used to retard the trailing edge of an output signal from the solar radiating condition sensor 42, as described later. Thereafter, the control goes on to a step E.

In this step E, the direction of solar radiation (an azimuth or position of the sun) is calculated based on the delayed solar radiation input values $S_{R1}$, $S_{L1}$ in a manner as described later. Then the control proceeds to a step F in which the quantity of solar radiation is calculated based on the delayed solar radiation input values $S_{R1}$, $S_{L1}$ calculated in the preceding step D. The control further goes on to a step G.

In the step G, a secondary filter calculation is achieved to calculate a solar radiation quantity control value $T_{SC}$ which is used for processing or modifying the output signal from the solar radiating condition sensor 42 in a manner as described later.

The step G is followed by a step H in which a total signal T is calculated in accordance with the following equation, based on the vehicle compartment temperature, the outside air temperature, etc.

$$T = K_1 T_R + K_2 T_{SC} + K_3 T_A - K_4 T_D + E$$

where $K_1$–$K_4$ are calculation coefficients, E is a calculated constant, $T_R$ is the vehicle compartment temperature, $T_{SC}$ is the solar radiation quantity control value calculated by the step G, $T_A$ is the outside air temperature and $T_D$ is the setting temperature.

Then the control proceeds to a step I in which the air-distributing door 26 is controlled based on a solar radiating direction signal calculated in the step E and at the same time the operation of various components of the air-conditioner such as the blower 16 and the air-mix door 18 is controlled based on the total signal T calculated in the step H. Thereafter, the control goes back to the step C and the aforesaid sequence of operations is repeated.

Figure 4:
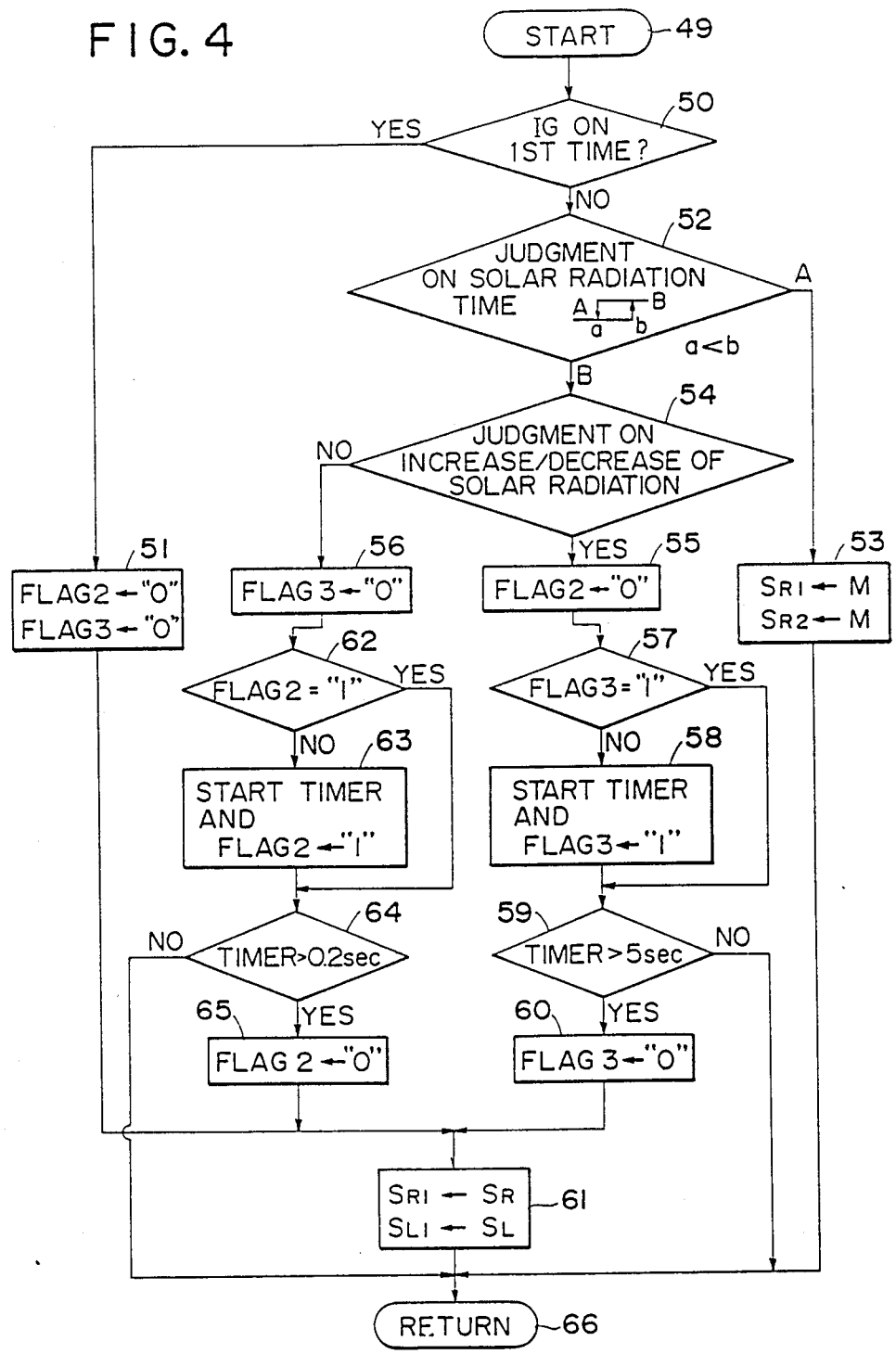
FIG. 4 is a flowchart showing a control subroutine achieved by the microcomputer for a primary filter calculating operation.

A control routine for the primary filter calculation step D will be described with reference to the flowchart shown in FIG. 4.

The control starts from a step 49 and in the next following step 50, it is judged whether an ignition switch (not shown) is turned on or not and, if turned on, a further judgment is made to determine as to whether such activation of the ignition switch is a first time or not. If yes, the control goes on to a step 51 in which a timer flag FLAG2 and a timer flag FLAG3 are set to "0" (zero), the timer flag FLAG2 being a holding timer flag for the respective leading edges of the right and left delayed solar radiation input values $S_{R1}$ and $S_{L1}$ shown in FIG. 9(b) which correspond to right and left input values $S_R$ and $S_L$ (shown in FIG. 9(a)) from the solar radiating condition sensor 42, while the timer flag FLAG3 is a holding timer flag for the respective trailing edges of the right and left delayed solar radiation input values $S_{R1}$, $S_{L1}$. Thereafter, the control proceeds to a step 61. The judgment in the step 50 indicates a second or subsequent activation of the ignition switch, then the control goes on to a step 52 for making a judgment whether a period of solar radiation is greater than a predetermined range. If the solar radiating period is longer than a first predetermined value b, then control goes on in a direction indicated by (B) to a step 54. Conversely, if the solar radiating period is smaller than a second predetermined value a (there is provided a hysteresis between the first and second predetermined values b and a), then the control goes on in a direction indicated by (A) to a step 53.

In the step 53, the solar radiating period is fictitiously controlled as being relatively short and the detected solar radiation quantity is converted to a value M which is equal to the solar radiating quantity obtained when the sunlight is blocked. More particularly, the right and left delayed solar radiation input values $S_{R1}$, $S_{L1}$ are set to these values which are supplied from the solar radiating condition sensor 42 when the sun disappears behind the clouds.

In the step 54, the right and left delayed solar radiation input values $S_{R1(n-1)}$, $S_{L1(n-1)}$ processes in the previous control sequence are compared respectively with a sum of the current right delayed solar radiation input value $S_{R1(n)}$ and a constant $X_1$ (corresponding to 0.2° C.) and a sum of the current left delayed solar radiation input value $S_{L1(n)}$ and the constant $X_1$. Thus, a judgment is made as to whether solar radiations have been changed or not. If $S_{R1(n-1)} > S_{R1(n)} + X_1$ and $S_{L1(n-1)} > S_{L1(n)} + X_1$, this means that the amount of solar radiations tends to decrease. Then the control proceeds to a step 55 for setting the FLAG2 to "0". Conversely, the foregoing conditions are not satisfied, then the control goes on to a step 56 for setting the FLAG3 to "0".

After the step 55, the control proceeds in a step 57 in which a judgment is made to determine as to whether FLAG3=1. If yes, the control goes on to a step 59 in which a further judgment is made to determine as to whether the timer has count 5 seconds. If yes, the control proceeds to a step 60 for setting the FLAG 3 to "0". Conversely, if the 5 seconds time period has not elapsed in the step 59, then the control returns to the main routine through a step 66. After the step 60, the control proceeds to a step 61 in which $S_{R1}$ and $S_{L1}$ are set to values $S_R$ and $S_L$, respectively. Then the control goes on to the step 66 from which it returns to the main control routine.

On the other hand, the step 56 is followed by a step 62 for judging whether FLAG2=1 or not. If yes, then the control goes on to a step 64. AlternativelY, if no, the control proceeds to a step 63 in which the timer is started and FLAG2 is set to "1". Then the control proceeds to a step 64 for making a judgment so as to determine whether the timer has counted 0.2 seconds or not. If yes, the control goes on to a step 65 in which the FLAG2 is set to "0". Alternatively, if the 0.2 seconds time period has not elapsed, the control returns to the main routine through the step 66. After the step 65, the control goes on to the step 61 for setting $S_{R1}$ and $S_{L1}$ to the values of $S_R$ and $S_L$, respectively. Then the control return to the main routine through the step 66.

Figure 9A:
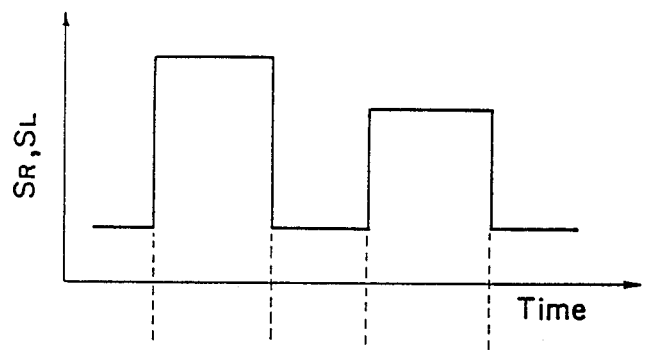
FIG. 9(a) is a graph illustrative of an input signal of a transverse direction solar radiation sensor.
Figure 9B:
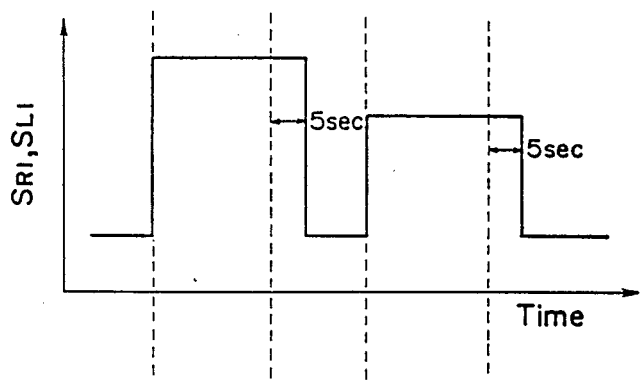
FIG. 9(b) is a graph showing an output signal of the transverse direction solar radiation sensor.

With the control steps described above with reference to FIG. 4, when the input value $S_R$ or $S_L$ supplied from the solar radiating condition sensor 42 decreases as shown in FIG. 9(a), the trailing edge of such input value $S_R$ or $S_L$ is delayed by 5 seconds so as to obtain a delayed solar radiation input value $S_{R1}$ or $S_{L1}$ shown in FIG. 9(b). Alternately, when the $S_R$ or $S_L$ is determined as tending to increase (if "NO" in the step 54), then the trailing edge of such input value $S_R$ or $S_L$ is delayed by 0.2 seconds to obtain a delayed solar radiation input value $S_{R1}$ or $S_{L1}$.

According to the primary filter calculation routine described above, a relatively short solar radiation period is canceled in the initial stage of the control flow or sequence. If such short solar radiation period occurs immediately after a relatively long solar radiation period, it is involved in the delay period of the input value corresponding to the long solar radiation period and therefore an input value corresponding to the short solar radiation period is automatically canceled.

As an alternative, the foregoing primary filter calculation may be achieved by processing the input signals $S_R$, $S_L$ from the solar radiating condition sensor 42 through a so-called primary delay digital filtering operation.

According to the primary delay digital filtering operation, the input signal $S_R$ or $S_L$ is processed to calculate an output value $S_{R1}$ or $S_{L1}$ in accordance with the following equation.

$$S_{R1} = (1-K)S_{R1(n-1)} + KS_R$$

where K is a coefficient determined by the sampling period T and the time constant CR. The coefficient K is indicated by the following equation, for example.

$$K = (T/CR)/(1+T/CR)$$

The foregoing calculation is repeated periodically and hence $S_{R1(n-1)}$ is equal to $S_{R1}$ obtained by the preceding calculation.

Figure 9C:
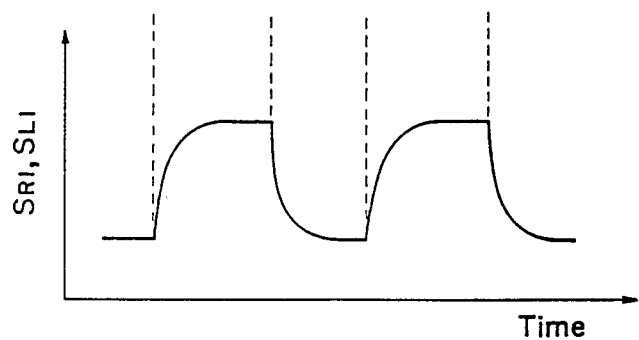
FIG. 9(c) is a graph similar to FIG. 9(b), but showing an output signal obtained by another primary filter calculation process.

The output signals $S_{R1}$, $S_{L1}$ obtained by this calculating operation are similar to those generally known as output signals of a primary delay digital filter, as shown in FIG. 9(c).

Figure 5:
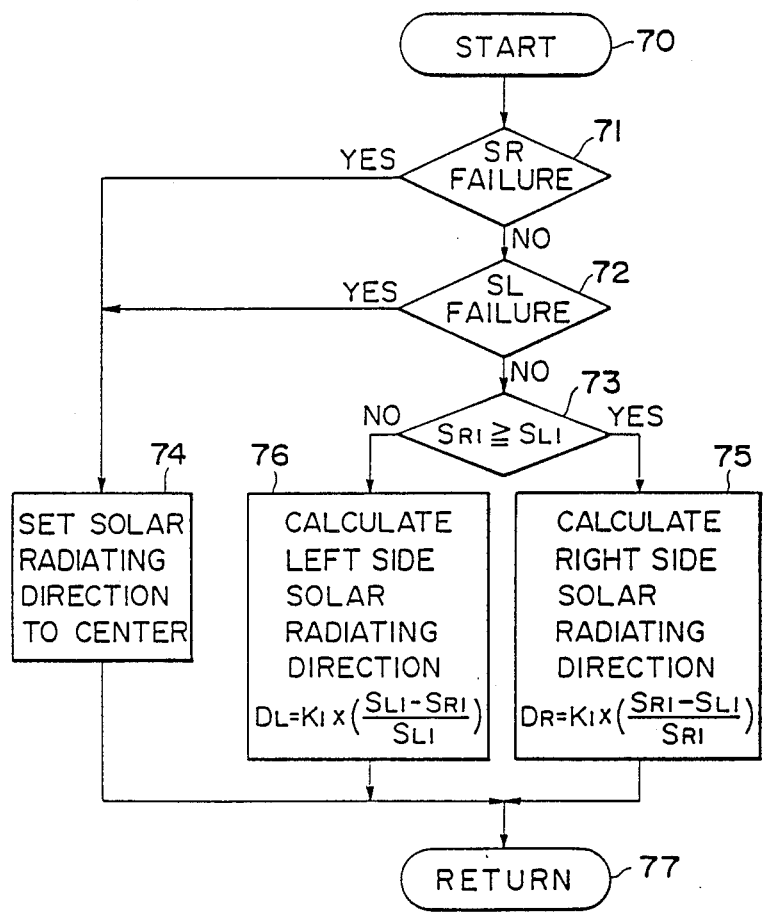
FIG. 5 is a flowchart showing a control subroutine achieved by the microcomputer in the control unit for a solar radiating direction calculating operation.

Then, a control routine for the solar radiating direction signal calculation routine E (FIG. 3) will be described below with reference to the flowchart shown in FIG. 5.

This routine starts from a step 70 and the control goes on to a step 71 in which a judgment is made to determine as to whether a right side solar radiation sensor SR is inoperative due to shorting, for example. If yes, the control proceeds to a step 74. Alternately, if no, then the control goes on to a step 72 for achieving a further judgment so as to determine as to whether a left side solar radiation sensor SL is inoperative or not. If yes, the control proceeds to the step 74. Conversely, if no, then the control goes on to a step 73.

Figure 10:
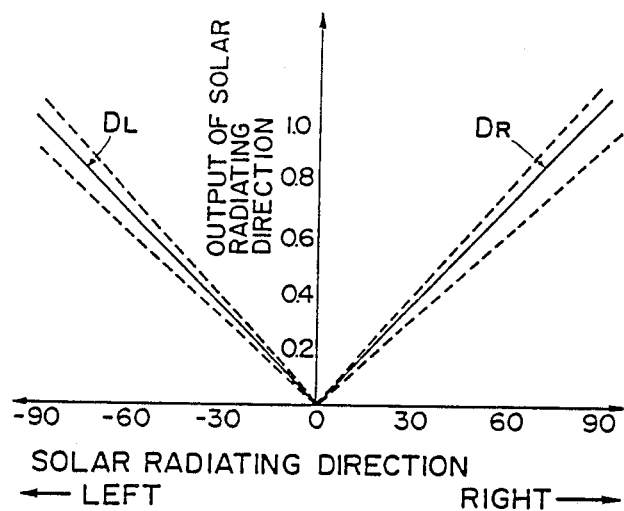
FIG. 10 is a graphical representation of performance curves used for the calculation of the solar radiating direction.

In the step 74, the direction of solar radiations is fictitiously set as being the center, i.e. at the position of 0°. Thereafter, the control returns to the main routine through a step 77. In the step 73, the aforesaid delayed right solar radiation input value $S_{R1}$ is compared with the delayed left solar radiation input value $S_{L1}$. If $S_{R1} \geq S_{L1}$, then the control goes on to a step 75. Conversely, if $S_{R1} < S_{L1}$, the control proceeds to a step 76. In the step 75, the delayed right and left solar radiation input values $S_{R1}$, $S_{L1}$ are processes to calculate a right side solar radiating direction value $D_R$ according to the equation indicated in FIG. 5, where $K_1$ is a constant. As shown in FIG. 10 (on the right side of the Y-axis), the right side solar radiating direction value $D_R$ is linear proportional to the right side solar radiating direction. As a result, this value $D_R$ can be used in the following control routine as it indicates the direction of solar radiations.

In FIG. 10, the performance characteristics curves indicated by broken lines are obtained when the constant $K_1$ is changed.

In the step 76, a left side solar radiating direction value $D_L$ is calculated in the same manner as done with respect to the calculation of $D_R$ stated above and hence a further description is not necessary. The left side solar radiating direction value $D_L$ thus calculated is indicated on the left side of the Y-axis in the graph shown in FIG. 10. In the same figure, the performance characteristic curves indicated by broken lines are obtained when the constant $K_1$ is changed. After the calculations of $D_R$ and $D_L$, then the control proceeds to the step 77 from which it returns to the main routine.

Figure 6:
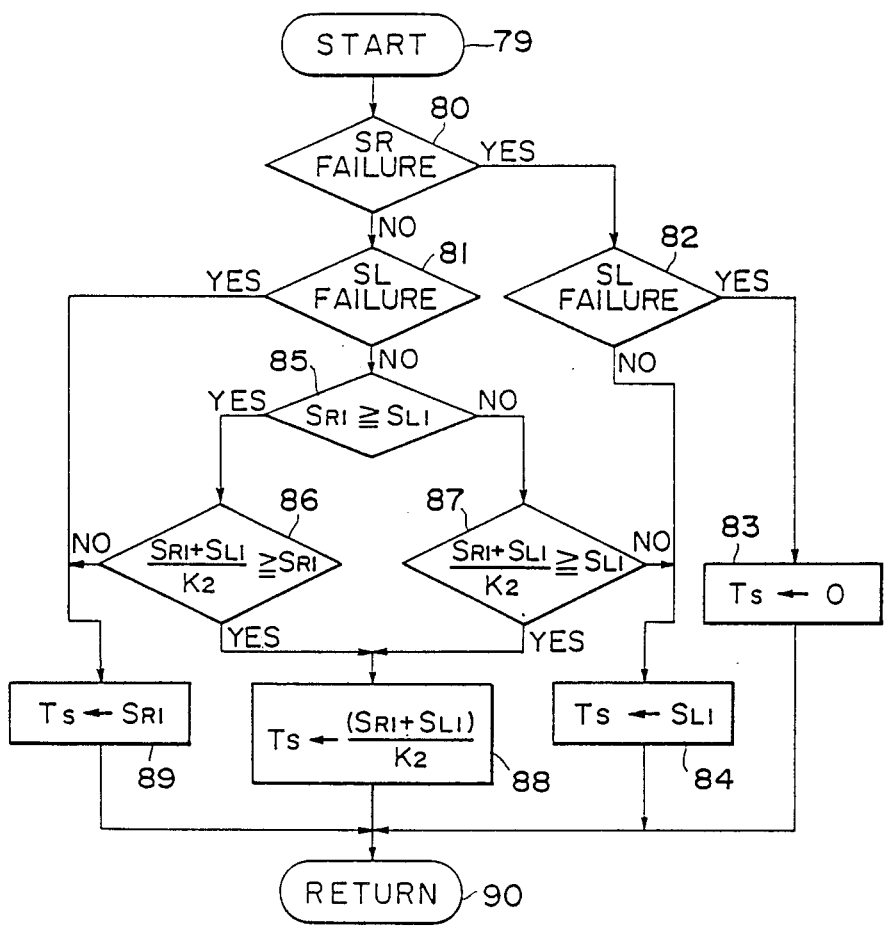
FIG. 6 is a flowchart showing a control subroutine achieved by the microcomputer for a solar radiation quantity calculating operation.

A description will be given to a control routine for the solar radiation quantity calculation F (FIG. 3) with reference to the flowchart shown in FIG. 6.

This routine starts from a step 79 and the control proceeds to a step 80 in which a judgment is made to determine as to whether the right side solar sensor SR is inoperative due to shorting, for example, If yes, the control goes on to a step 82. Conversely, if no, the control proceeds to a step 81.

In the step 82, it is judged whether left side solar radiation sensor SL is inoperative or not. If yes, then the control goes on to a step 83 for setting a control target solar insolation quantity $T_S$ to "0". Thereafter, the control returns to the main routine through a step 90. If failure of SL is not detected in the step 82, then the control proceeds to the step 84. On the other hand, in the step 81 a judgment is made to determine as to whether the left side solar radiation sensor SL is inoperative due to shorting, for example. If yes, the control goes on to a step 89. If no, then the control proceeds to a step 85 in which the delayed right solar radiation input value $S_{R1}$ is compared with the delayed left solar radiation value $S_{L1}$. If $S_{R1} \geq S_{L1}$, the control goes on to a step 86. Conversely, if $S_{R1} < S_{L1}$, then the control goes on to a step 87.

Figure 11:
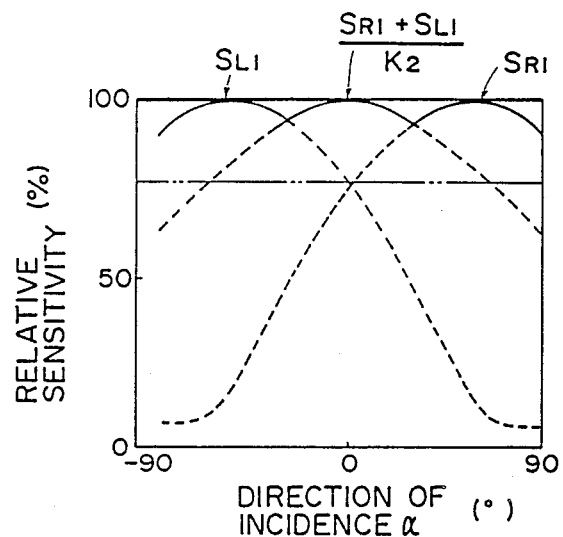
FIG. 11 is a graph showing solar radiation quantity performance curves solar radiation quantity used for the calculation of solar radiation quantity.

In the step 86, a comparison is made between the delayed right solar radiation input value $S_{R1}$ corresponding to the input characteristic curve of the solar sensor which is shown on the right side of FIG. 11, and a composite value $(S_{R1}+S_{L1})/K_2$ is a constant such as 1.69, for example) of the input characteristics of the right and left side solar radiation sensors. If $(S_{R1}+S_{L1})/K_2 \geq S_{R1}$, then the control proceeds to a step 88 for setting the control target solar insolation quantity $T_S$ to the composite value $(S_{R1}+S_{L1})/K_2$. Stated otherwise, the control target solar radiation quantity is determined by using portions of the input characteristic curves of the solar radiation sensors indicated by the solid line in FIG. 11.

If the comparison in the step 86 indicates $(S_{R1}+S_{L1})/K_2 < S_{R1}$, then the control goes on to the step 89 for setting the control target solar radiation quantity $T_S$ to the delayed right solar radiation input value $S_{R1}$.

On the other hand, in the step 87, a comparison is made between $(S_{R1}+S_{L1})/K_2$ and the delayed left solar radiation input value $S_{L1}$ in the same manner as done in the step 86. If $(S_{R1}+S_{L1})/K_2 \geq S_{L1}$, the control proceeds to the step 88 for achieving the forgoing processing operation. If $(S_{R1}+S_{L1})K_2 < S_{L1}$, then the control goes on to the step 84 to set the control target solar radiation quantity $T_S$ to the delayed left solar radiation input value $S_{L1}$. After the step 89, 88 and 84, the control returns to the main routine through the step 90.

Figure 7:
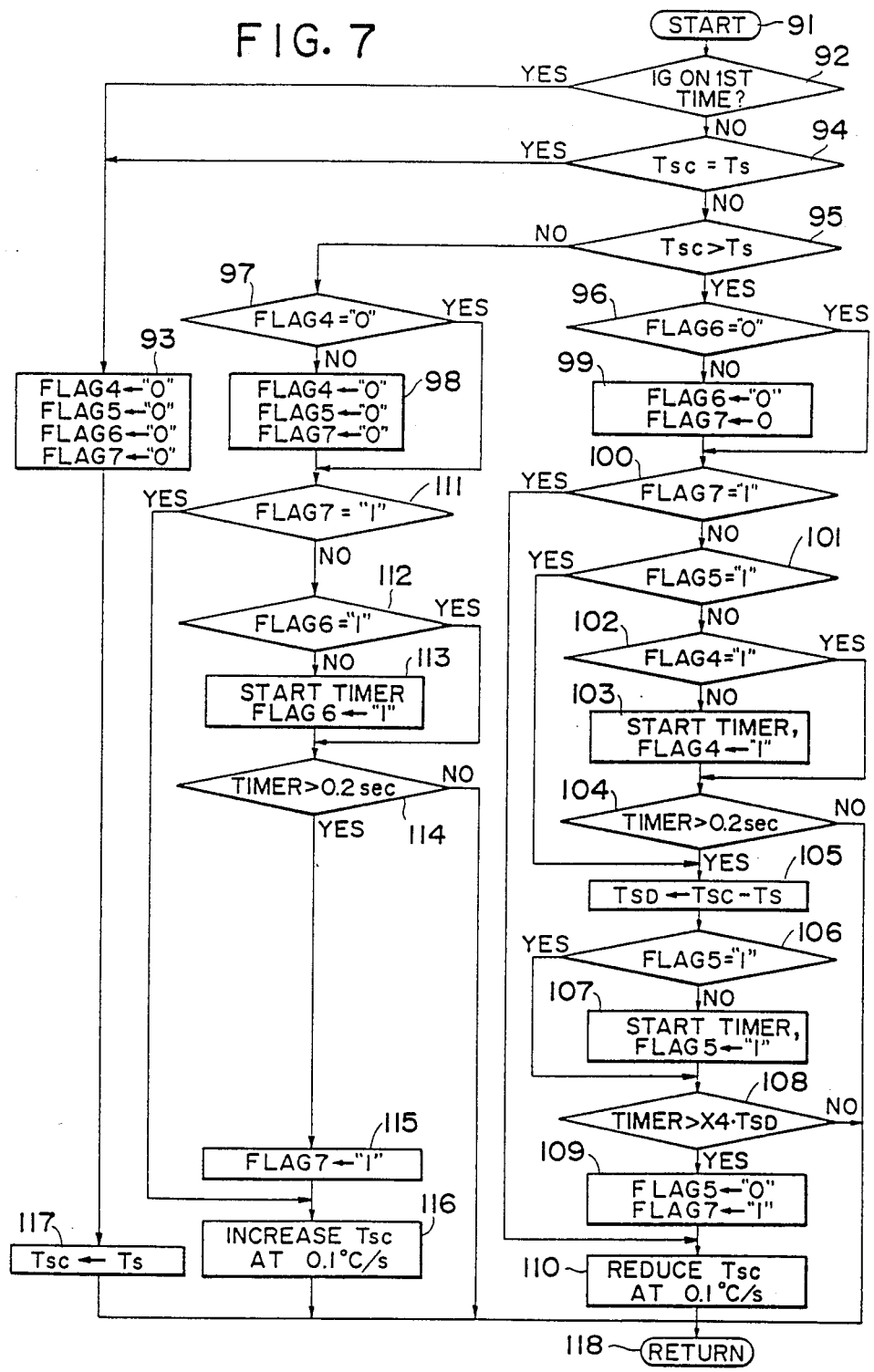
FIG. 7 is a flowchart showing a control subroutine achieved by the microcomputer for a secondary filter calculating operation.

Then, a control routine for the secondary filter calculation G shown in FIG. 3 will be described below with reference to the flowchart shown in FIG. 7.

This control routine starts from a step 91 and the control proceeds to a step 92 in which a judgment is made to determine as to whether the ignition switch (not shown) is turned on and, if yes, whether this activation of the ignition switch is the first time or not. If yes, the control goes on to a step 93. Conversely, in the case of no, then the control proceeds to a step 94. In this step 94, a judgment is made to determine whether the control target solar radiation quantity $T_S$ calculated in the target solar radiation quantity calculation step F (FIG. 3) is equal to solar radiation quantity control value $T_{SC}$ which is calculated in this control routine in the manner described below. If $T_S = T_{SC}$, the control goes on to the step 93. Alternately, if $T_S$ is not equal to $T_{SC}$, then the control proceeds to a step 95 for comparing the control target solar radiation quantity $T_S$ and the solar radiation quantity control value $T_{SC}$. If $T_{SC} > T_S$, the control proceeds to a step 96. Conversely, if $T_{SC} \leq T_S$, then the control goes on to a step 97. In the step 96, it is judged as to whether a solar radiation quantity increase detection timer flag FLAG6 is set to "0" or not. If FLAG6 is "0", then the control goes on to a step 100. If FLAG6 is not "0", the control proceeds to a step 99 in which FLAG6 and a delay pattern execution judgment flag FLAG7 are set to "0". Thereafter, the control proceeds to the step 100. In this step 100, it is judged as to whether FLAG7 is "1" is not. If yes, the control goes on to a step 110. Conversely, if FLAG7 is not set to "1", then the control proceeds to a step 101 for making a further judgment so as to determine as to whether a control value fixing timer flag FLAG5 is "1" or not, the FLAG5 being used for fixing the control value when the solar radiation quantity decreases. If FLAG5 is "1", the control goes on to a step 105. If FLAG5 is not "1", then the control proceeds to a step 102 in which judgment is made to determine as to whether a solar radiation quantity decrease detection timer flag FLAG4 is "1" or not. If FLAG4 is "1", the control goes on to a step 104. Alternately, if FLAG4 is not "1", then the control proceeds to a step 103 for starting the timer to set FLAG4 to "1".

In the step 104, it is judged whether the timer has counted to 0.2 seconds or not. If yes, the control proceeds to the step 105. Alternately, if the 0.2 time period has not elapsed, then the control goes on to a step 118 from which it returns to the main routine. In the step 105, the solar radiation control value $T_{SC}$ is subtracted by the control target solar radiation quantity $T_S$ and the resulting value $(T_{SC} - T_S)$ is set as a variation $T_{SD}$ at the time of decrease of solar radiation. Then the control proceeds to a step 106 in which it is judged whether FLAG5 is "1" or not. If FLAG5 is "1", then the control goes on to a step 108. Alternately, if FLAG5 is not "1", the control proceeds to a step 107 for starting the timer to set FLAG5 to "1". In the step 108, it is judged whether the timer has counted a solar radiation quantity control value fixing time period (max. 45 seconds) which is obtained by multiplying the aforesaid $T_{SD}$ by a solar radiation quantity fixing time period determination constant $X_4$. If the timer has already counted this time period, the control proceeds to a step 109 in which FLAG5 is set to "0" and FLAG7 is set to "1". If the control value fixing time period has not elapsed, then the control goes on to the step 118 from which it returns to the main routine. The step 109 is followed by a step 110 in which the value for $T_{SC}$ is reduced at the rate of 0.1° C./sec. with respect to the $T_S$ value. Thereafter, the control proceeds to the step 118, then returning to the main routine.

On the other hand in the step 97, it is judged whether FLAG4 is "0" or not. If yes, the control goes on to a step 111. If FLAG4 is not "0", then the control proceeds to a step 98 in which FLAG4, FLAG5 and FLAG 7 are set to "0". In the step 111, it is judged whether FLAG7 is "1" or not. If yes, then the control goes on to a step 116. Conversely, if FLAG 7 is not "1", the control proceeds to a step 112 in which a judgment is made to determine as to whether FLAG6 is set to "1" or not. If yes, the control goes on to a step 114. Alternately, if FLAG 6 is not "1", then the control proceeds to a step 113 for starting the timer to set FLAG6 to "1". Then the control proceeds to the step 114 in which is judged whether the timer has counted 0.2 seconds or not. If yes, the control proceeds to a step 115 for setting FLAG7 to "1". Conversely, the 0.2 seconds time period has not elapsed, then the control goes on to the step 118 from which it return to the main routine. The step 115 is followed by a step 115 in which the $T_{SC}$ value is increased at the rate of 0.1° C./sec. with respect to the $T_S$ value. Thereafter, the control proceeds to the step 118, then returning to the main routine. In the aforesaid step 93, FLAG4, FLAG5, FLAG6 and FLAG7 are set to "0". Then the control proceeds to a step 117 in which the $T_{SC}$ value is set to $T_S$. Thereafter the control proceeds to the step 118 from which it returns to the main routine.

Figure 12A:
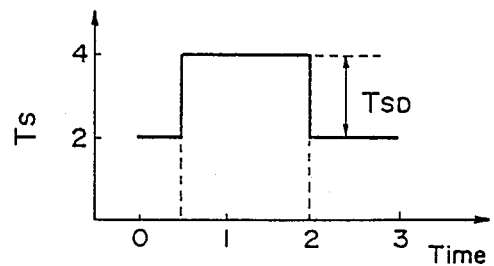
FIG. 12(a) is a graph showing a target solar radiation quantity.
Figure 12B:
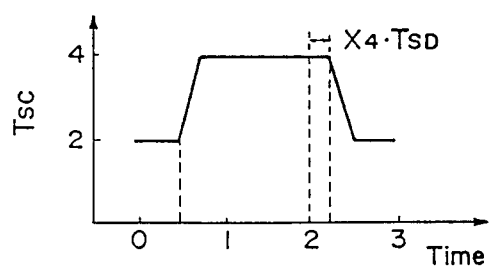
FIG. 12(b) is a graph showing a control value for the solar radiation quantity.

Now considering that an automobile running in the shade is suddenly exposed to the direct rays of the sun when the sun appears from the back of obstacles such as buildings, the control target solar radiation quantity $T_S$ and the solar radiation quantity control value $T_{SC}$ initially have a same value 2 as shown in FIGS. 12(a) and 12(b) because a certain amount of solar radiation is present even when the sun disappears behind the buildings. When the sun appears from the back of the buildings, the control target solar radiation quantity $T_S$ immediately increases from the value 2 to the value 4 as shown in FIG. 12(a), while the solar radiation quantity control value $T_{SC}$ increases progressively at a predetermined rate of variation toward the $T_S$ value and 0.2 seconds after the change of $T_S$ value, the $T_{SC}$ value becomes equal to the $T_S$ value, as shown in FIG. 12(b). Thereafter, $T_{SC}=T_S$ until $T_S$ value decreases.

When the sun again disappears behind the buildings, the $T_S$ value decreases, as shown in FIG. 12(a). In this instance, however, a change of the $T_{SC}$ value does not occur until expiration of a prescribed time period $(X_4 \cdot T_{SD})$ which is proportional to the amount of decrease of $T_S$ value. Thereafter, the $T_{SC}$ value decreases progressively at a predetermined rate of variation toward the $T_S$ value, as shown in FIG. 12(b).

Obviously, various modifications and variations of the present invention are possible in the light of the above teaching. It is therefore to be understood that within the scope of the appended claims the present invention may be practiced otherwise than as specifically described.

What is claimed is:

1. An apparatus for controlling an automobile air-conditioner, comprising:
   (a) at least one transverse direction solar radiation quantity detection means having two light receiving surfaces inclined at an angle and facing transversely of the direction of movement of an automobile;
   (b) primary filter calculation means for smoothening rapid fluctuations of a solar radiation signal detected by said transverse direction solar radiation quantity detection means;
   (c) solar radiating direction calculation means for calculating the direction of solar radiation by using the result of calculation by said primary filter calculation means;
   (d) solar radiation quantity calculation means for calculating the quantity of solar radiation received in a vehicle passenger compartment by using the result of calculation by said primary filter calculation means;
   (e) secondary filter calculation means for changing an output signal from said solar radiation quantity calculation means in such a manner that said output signal increases progressively at a first predetermined gradient from the leading edge of the detection of solar radiation and also decreases progressively at a second predetermined gradient from the time near the trailing edge of the detection of solar radiation;
   (f) total signal calculation means for calculating a total signal corresponding to a thermal load in the vehicle passenger compartment based on at least a vehicle passenger compartment temperature, a setting temperature and the result of calculation by said secondary filter calculation means;
   (g) air-distributing door drive means for actuating an air-distributing door based on the result of calculation by said solar radiating direction calculation means;
   (h) thermal load adjustment means for adjusting the thermal load on said automobile air-conditioner, said adjustment means including at least an air-flow duct opening to the vehicle passenger compartment, a blower disposed in said duct for forcing air downstream through said duct to the vehicle passenger compartment, a heat exchanger disposed in said duct for subjecting air to heat-exchanging process as the air is forced to pass around said heat exchanger; and
   (i) thermal load drive means for driving said thermal load adjustment means based on the result of calculation by said total signal calculation means.

2. An apparatus according to claim 1, wherein said primary filter calculation means is operable to produce an output signal whose trailing edge is delayed by a predetermined time period from the trailing edge of an input signal supplied to said primary filter calculation means.

3. An apparatus according to claim 1, wherein said primary filter calculation means is operable to produce an output signal after processing an input signal through a primary delay digital filtering operation.

* * * * *